United States Patent
Yagmur

(10) Patent No.: US 11,779,930 B2
(45) Date of Patent: Oct. 10, 2023

(54) CONTAINER FOR STORING A BODILY FLUID

(71) Applicant: DC DIAGNOSTICS CONCEPT UG (HAFTUNGSBESCHRANKT), Aachen (DE)

(72) Inventor: Nagle Yagmur, Aachen (DE)

(73) Assignee: DC DIAGNOSTICS CONCEPT UG (HAFTUNGSBESCHRANKT), Aachen (DE)

( * ) Notice: Subject to any disclaimer, the term of this patent is extended or adjusted under 35 U.S.C. 154(b) by 111 days.

(21) Appl. No.: 17/443,965

(22) Filed: Jul. 29, 2021

(65) Prior Publication Data
US 2022/0040688 A1 Feb. 10, 2022

Related U.S. Application Data

(63) Continuation-in-part of application No. PCT/EP2020/052615, filed on Feb. 3, 2020.

(30) Foreign Application Priority Data

Feb. 1, 2019 (DE) ...................... 10 2019 102 597.4

(51) Int. Cl.
*B01L 3/00* (2006.01)
*C08J 7/04* (2020.01)

(52) U.S. Cl.
CPC ........... *B01L 3/50825* (2013.01); *C08J 7/042* (2013.01); *B01L 2300/042* (2013.01);
(Continued)

(58) Field of Classification Search
CPC ........... B01L 3/50825; B01L 2300/042; B01L 2300/0832; B01L 2300/163; C08J 7/042;
(Continued)

(56) References Cited

U.S. PATENT DOCUMENTS

| 4,260,714 A | 4/1981 | Wingard, Jr. et al. |
| 5,300,566 A | 4/1994 | Pinschmidt, Jr. et al. |

(Continued)

FOREIGN PATENT DOCUMENTS

| CN | 101 779 959 A | 7/2010 |
| EP | 1243622 A2 | 9/2002 |

(Continued)

OTHER PUBLICATIONS

Liu "Perfluorphenyl azides: New Applications in surface Functionalization and nanomaterial synthesis" Acc Chem Res. Nov. 2010. 16 43 (11): 1434-1443. (Year: 2010).*

(Continued)

*Primary Examiner* — Samuel P Siefke
(74) *Attorney, Agent, or Firm* — Duane Morris LLP; Thomas J. Kowalski; Deborah L. Lu

(57) ABSTRACT

A container (1) for storing a bodily fluid, for example a blood collection tube (2), comprising: an interior space (4) configured to store the bodily fluid; and a wall (5) enveloping the interior space, wherein a surface of the wall (5) facing the interior space (4) of the container (1) forms a contact surface (6), wherein at least a portion of the contact surface (6) is provided with a primer coating (7), wherein the primer coating (7) is formed from a perfluorophenyl azide (PFPA) including an azide group (9) and a functional group (10), and wherein a co polymer made from poly (N-vinylamine-co-N-vinyl acetamide) is bonded to the functional group (10) of the primer coating (7). The invention also relates to a method for coating a contact surface (6) of a container (1) for storing a bodily fluid.

12 Claims, 3 Drawing Sheets

(52) U.S. Cl.
CPC . *B01L 2300/0832* (2013.01); *B01L 2300/163* (2013.01); *C08J 2377/00* (2013.01)

(58) Field of Classification Search
CPC ................ C08J 2377/00; C08J 2323/08; C08J 2323/14; C08J 2379/02
See application file for complete search history.

(56) References Cited

U.S. PATENT DOCUMENTS

| | | |
|---|---|---|
| 7,553,546 B1 | 6/2009 | Tan |
| 2003/0148017 A1 | 8/2003 | Tuominen et al. |
| 2005/0244456 A1 | 11/2005 | Nilsson et al. |
| 2006/0015057 A1 | 1/2006 | Ho et al. |
| 2010/0145286 A1 | 6/2010 | Zhang et al. |
| 2017/0362458 A1 | 12/2017 | Cheng et al. |

FOREIGN PATENT DOCUMENTS

| | | |
|---|---|---|
| EP | 1 553 993 A2 | 7/2005 |
| EP | 1199104 B1 | 1/2010 |
| EP | 3 838 911 A1 | 6/2021 |
| WO | 2016/177354 A2 | 11/2016 |
| WO | 2017/201612 A1 | 11/2017 |

OTHER PUBLICATIONS

Drean, "Far beyond primary poly(vinylamine)s through free radical copolymerization and amide hydrolysis" Polymer Chemistry Issue 1, 2016. (Year: 2016).*
International Search Report dated Jul. 13, 2020 in International Application PCT/EP2020/052615.
Extended EP Search Report dated Apr. 19, 2022 issued in copending EP Application No. 21191712.5.

* cited by examiner

CONTAINER FOR STORING A BODILY FLUID

RELATED APPLICATIONS AND INCORPORATION BY REFERENCE

This application is a continuation-in-part of International application PCT/EP2020/052615 filed on Feb. 3, 2020 and published as international Publication No. WO 2020/157331 on Aug. 6, 2020 and which application claims priority from German Patent Application DE10 2019 102 597 filed on Feb. 1, 2019.

The foregoing applications, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE INVENTION

The invention relates to a container for storing a bodily fluid, for example a blood collection tube, including an interior space configured to store the bodily fluid; and a wall enveloping the interior space, wherein a surface of the wall facing the interior space of the container forms a contact surface, wherein at least a portion of the contact surface is provided with a primer coating, wherein the primer coating is formed from a perfluoro phenyl azide (PFPA) including an azide group and a functional group. The invention also relates to a method for coating a contact surface of a container for storing a bodily fluid.

BACKGROUND OF THE INVENTION

During a diagnostic process characterizing quantitative biomarker concentrations and activities and cell and particle morphologies in blood and in other bodily fluids (extra vasal fluids (EVF)) in combination with anamnesis facilitates a clinical diagnosis decision. A precondition for a reliable decision is a maximum degree of preanalytical stabilization of blood and EVF after collection from a blood vessel and an ex-vivo storage until the analysis is performed. So far collected samples of a bodily fluid are stored in glass or plastic tubes typically made from polypropylene (PP) until the actual analysis is performed. Thus, numerous change processes occur in all elements of these fluids, for example blood, after they are extracted from a body of a patient. Protein absorption, cell adhesion and clotting of the bodily fluid occurs in the tube due to a contact of the collected bodily fluid with a wall of the tube. In order to stabilize their numerous and different components, their concentration and activities e.g; in blood, the typical process is adding additives like EDTA, citrate or heparin into the tube. However, not every additive is suitable for every biomarker so that the treating physician has to select a special tube depending on the anticipated illness. Additionally, dwell time, temperature resistance or light exposure duration in the containers is very limited and can also lead to incorrect analysis results when exceeded. Additionally, the additives like EDTA, citrate, or heparin can only impede blood clotting. Numerous other aspects of the degradation process are not prevented.

A container for storing bodily fluids is in in the patent application EP 1 199 104 B1. A blood collection tube made from polypropylene reduces adhesion of blood components at a contact surface of the blood collection tube. Suitable coating materials are the hydrophilic polymers polyvinyl alcohol, polyvinyl acetate, polyvinyl pyrrolidone (PVP), polystyrol sulfonate and copolymers and combinations thereof. The hydrophilic polymers are applied to the inside of the blood collection tubes by spraying or dipping methods and cross linked by radiation after a final air drying or oven drying. Additionally, the blood collection tubes can include additives which accelerate or retard blood clotting.

The U.S. Pat. No. 5,830,539 relates to a method for coating a substrate to render it functional. The coating is intended to increase biocompatibility of the substrate. Thus, a first functionalizing reactive agent is applied to the substrate so that a covalent bonding at the substrate is caused by nitrene addition. The first functionalizing reactive agent includes an azide group and a first functionalizing group, e.g; an active ester, wherein the azide group is provided to react with the substrate whereas the first functionalizing group is intended to facilitate the bonding of a second functionalizing reactive agent to the first functionalizing reactive agent.

The second functionalizing reactive agent also includes a functionalizing group that is to be bound to the substrate, e.g. enzymes, antibodies, diagnostic agents or therapeutic agents. The purpose of the substrate thus coated is to bind biological or bodily substances like enzymes, hormones, anti-bodies, nucleonic acids, peptides or amino acids. Advantageous functionalizing reactive agents are N-hydroxy succinimide-active ester-functionalized perfluorophenyl azides (NHS-PFPAs).

It is a known disadvantage of the prior art containers that a derivatization of perfluorophenyl azide by NHS is rather unsuitable for use in liquid media, for example, blood and EVF due to a moisture sensitivity of the NHS. For example a derivatized perfluorophenyl azide of this type requires a suitable stabilization.

Citation or identification of any document in this application is not an admission that such document is available as prior art to the present invention.

BRIEF SUMMARY OF THE INVENTION

Thus, it is an object of the instant invention to develop an alternative container for storing a bodily fluid that is characterized by a primary coating that improves a bonding of a second coating at a contact surface of the container. The object is also achieved by the method according to the invention.

Improving upon the container recited supra for storing a bodily fluid the object is achieved by binding a copolymer made from poly (N-vinylamine-co-N-vinyl acetamide) to the functional group of the primer coating.

With respect to the hydrophobic properties of contact surfaces that come in contact with extra vasal liquids this coating is particularly advantageous. The reason is that typical contact surfaces, e.g; contact surfaces made from polypropylene are well suited as a material for a blood retrieval due to their chemically inert properties, however they cause problems when this hydro phobic material is to be coated. For example applying aqueous solutions and substances is made more difficult in that the surface is not completely wetted. Thus, bonding water based chemical substances that prevent degradation processes of blood and other bodily liquids is impeded.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product. It may be advantageous in the practice of the invention to be in compliance with Art. 53(c) EPC and Rule 28(b) and (c) EPC. All rights to explicitly disclaim any embodiments that are the subject of any granted patent(s) of applicant in the lineage of this application or in any other lineage or in any prior filed application of any third party is explicitly reserved. Nothing herein is to be construed as a promise.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

BRIEF DESCRIPTION OF THE DRAWINGS

The following detailed description, given by way of example, but not intended to limit the invention solely to the specific embodiments described, may best be understood in conjunction with the accompanying drawings.

The invention is now described based on embodiments with reference to drawing figures, wherein.

DETAILED DESCRIPTION OF THE INVENTION

Figure 1:
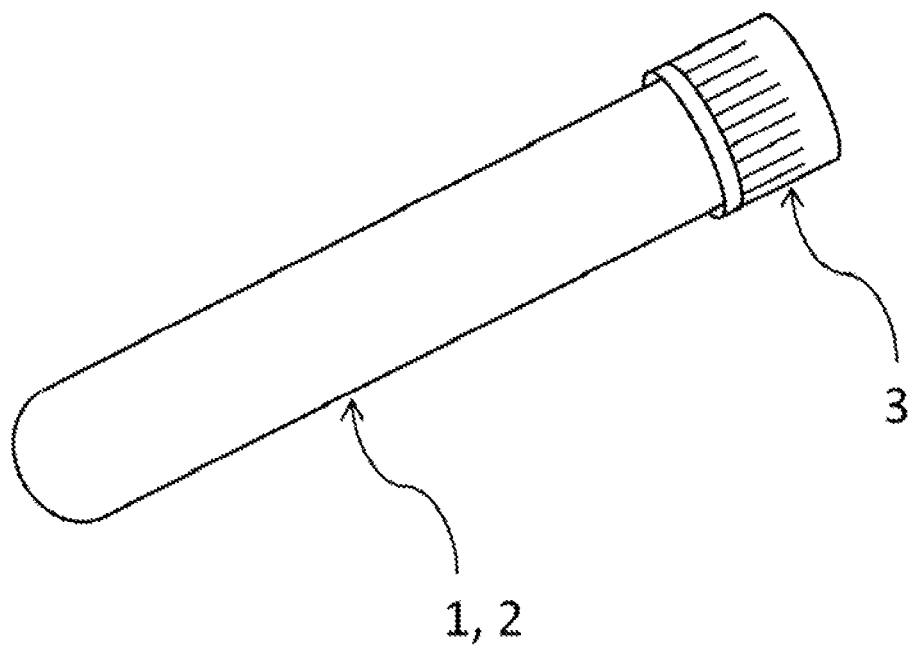
FIG. 1 illustrates a 3-dimensional view of the blood collection tube according to the invention.

Phenyl azides are among the best-known coupling agents due to their high reaction efficiency, fast kinetics, excellent storability and simple preparation. Thus, a fluorized phenyl azide, for example perfluorophenyl azide (PFPA) functions as a hetero bifunctional cross linker. The perfluorophenyl azide (PFPA) is a photo affine coupling reactive agent which facilitates a surface modification as well as a polymer cross linking or bonding. The perfluorophenyl azide (PFPA) was thus produced by derivatizing pentafluoro benzo acid methyl ester by adding sodium azide (NaN3). Since perfluorophenyl azide reacts with its functional group with carbon-hydrogen-, ammonia-hydrogen or carbon-carbon bonds a coupling to a broad spectrum of molecules and materials is efficient and usable in a highly reproducible manner and thus quite universal.

The perfluorophenyl azide thus acts as an adhesion agent and a coupling agent for a contact surface of a container and for a second coating due to its attractive hetero bifunctional properties. The fluorized phenyl azide is capable of forming a stable covalent bond on the one hand side with its azide group with the tube wall. On the other hand side the substrate reactive functional group "—R" of the fluorized phenyl azide facilitates a tailored bonding of a static copolymer, wherein the copolymer according to the invention is made from poly(N-vinylamine-co-N-vinyl acetamide). The perfluorophenyl azide is thus not derivatized any further contrary to known primer coatings.

A particular advantage of the container according to the invention is thus the ability of the primer coating to bond to the contact surface of the container on the one hand side and to provide a capability for an additional coating which prevents change processes of the components of the blood or the extravasal bodily fluids. Overall the reactivity of the perfluorophenyl azide and its functional group facilitates performing coupling reactions selectively and sequentially and thus joining molecules or surface materials of different types. Thus, the primer coating according to the invention contrary to the prior art primer coatings according to the invention has the effect of preventing a bonding of biological and bodily substances in order to prevent any adhesion or absorption of biological or bodily substances.

The bonding of the perfluorophenyl azide to the contact surface of the blood collection tube is possible for example through the azide group of the perfluorophenyl azide which is activated by a suitable treatment so that an irreversible chemical bond with the surface of the container can be formed. Additionally, the amino groups of the copolymer are acid hydrolyzed in a chemical reaction. Adding a suitable chemical substance facilitates functionalizing the amino groups of the co polymer so that they provide locally selective bonding locations, so to speak anchor points for a second coating. The second layer can thus be applied to the preceding primer coating in a particularly simple manner without causing problems with respect to wetting the substance on the contact surface of the container. Thus, a permanent bonding of the second coating to the inert wall of the container can be achieved.

The primer coating according to the invention is advantageous for example in that the functional rest of the perfluorophenyl azide is formed from a static copolymer, namely a poly(N-vinylamine-co-N-vinyl acetamide). Tests have shown that a copolymer of this type is particularly suitable to stabilize the phenyl ring of the perfluorophenyl azide and to impede an excessive electrophilic propensity of the perfluorophenyl azide so that unwanted chemical reactions of the perfluorophenyl azide are limited. Thus, the polyamide polymer itself does not interact with the blood or the extra vasal liquid.

According to an advantageous embodiment of the container it is provided that the container is made from a synthetic material, advantageously polypropylene, polystyrol, polymethylmethylacrylate, polyimide or glass. The preceding materials are typically used in the field of medicine and have proven suitable for the production of disposable products due to their low fabrication cost.

According to an advantageous embodiment of the invention the container has a second coating including PEG/PEO-PPO-copolymers, poly-(3-methacryloylaminopropyl)-(2- carboxyethyl)-dimethylmmonium-carboxybetain-methylacrylamid (pCBMAA-1) or polypeptide based block copolypeptides, wherein the second coating is connected with the primer coating.

The second coating comes into direct contact with the blood or the extra vasal liquid, but does not cause any chemical reaction. Advantageously this prevents that the bodily fluid that is to be examined is modified before a lab analysis and differs in quantity and quality from an actual composition in the blood or in the bodily fluid.

The PEG/PEO-PPO-copolymer is composed from a star shaped 6-arm polyethylene glycol or -ethylene oxide (PEG Or PEO) with a specific propylene oxide (PPO) modification to prevent a crystallization of the polymer. According to an advantageous embodiment of the invention it is provided that the copolymer is bondable by its isocyanate groups to the amino groups of the primer coating.

Poly-(3-methacryloylaminopropyl)-(2-carboxyethyl)-dimethylmmonium-carboxybetain-Methylacrylamid (pCBMAA-1) is electrically neutral, dipolar ionic and cosmotropic. The bonding with the primer coating is performed by a radical polymerization. Advantageously an electron transfer reaction (SET-LRP, single electron transfer living radical polymerization) is being used.

The poly peptide based bock copolypeptides are produced by recombinant DNA technology. Advantageously these are assembled from electrically neutral and protein rejecting elastin-polypeptide arrangements. The polypeptide arrangements are electrically charged and cause the bonding of the arrangement to the primer coating (negative charge) or to plasma treated surfaces (positive charge). Di polar ionic polypeptide-based block co poly peptides, electrically neutral arrangements are also conceivable.

Advantageously the container includes a closure lid or a closure cap advantageously made from polyethylene (PE) that encloses the bodily fluid in the container air tight. It is also conceivable that the closure cap includes a membrane which can be pierced by a needle in order to let the bodily fluid flow into the container. In order to retrieve blood from a vein of a patient the container is advantageously evacuated. Thus, the blood can be pulled into the container by the vacuum after a needle is pierced into a vein of the patient and connected through a hose with the container. Alternatively, the container includes a piston rod that is arranged in an interior of the container and includes a piston that pulls the bodily fluid into the container when the piston is moved. Advantageously the closure lid is made from polyethylene (PE) and piston rod is made from polystyrol (PS).

In an advantageous embodiment of the container according to the invention the closure cap is also provided with the second coating. The same applies for the piston.

The object is also achieved by a method for coating a contact surface of a container for storing a bodily fluid, the method which may comprise two steps. A first step includes applying a perfluorophenyl azide including an azide-group and a functional group to the contact surface of the container, wherein the primer coating is formed form a perfluorophenyl azide (PFPA) with an azide group and a functional group. A second step includes treating the perfluorophenyl azide so that the azide group of the perfluorophenyl azide bonds to the contact surface of the container so that a coating is generated that is inseparably connected with the contact surface.

Similar to the container according to the invention it is an advantage of the method according to the invention to provide a primer coating which is particularly well suited to bond with a second coating. Thus, the second coating prevents undesirable change processes of the bodily fluids in the container. This property is desirable in that it forms a precondition for a high level of stabilization of the bodily fluid in the container which facilitates making correct diagnostic and therapy decisions.

Further advantageously an activation step is performed to improve the adhesion of the primer coating at the contact surface of the container, wherein the activation step is advantageously performed before the first method step and/or an activation step is performed for improving an adhesion of the second coating at the primer coating, wherein the activation step is advantageously formed after the second method step.

Advantageously at least one activation step is performed by UV radiation or by plasma treatment, wherein the plasma is formed from a noble gas, advantageously argon or oxygen. The plasma treatment causes a controlled removal of an outer most layer of the poly propylene. This causes a negative zeta potential which additionally improves adhesion of the primer coating. This property is desirable in that it facilitates reducing a concentration of the perfluorophenyl in the solution that is to be applied.

The inventors have found that polypeptide-based block copolypeptides including an elastin-polypeptide arrangement with a poly peptide with an electrically positive charge bonds particularly well to a plasma treated layer. The same applies for di polar ion polypeptide-based block copolypeptides with electrically positively charged poly peptide components. Polypeptide-based block copolypeptides that include an elastin-polypeptide arrangement with an electrically negatively charged poly peptide bond particularly well to the primer coating.

Furthermore, the plasma treatment forms nucleophilic groups which are particularly advantageous with respect to the second coating. This has the effect that the second coating can bond particular well to the contact surface of the container without a prior primer coating.

Advantageously the first method step is performed by letting the perfluorophenyl azide into the container or spraying the perfluorophenyl azide into the container.

The chemical substances are either provided in a liquid form or can be processed into an aqueous solution due to their water solubility. Advantageously the contact surface of the container is wetted by the respective substance by filling the chemical substances into the container. Superfluous liquid portions are subsequently removed from the container by pouring. It is also conceivable that the contact surface is provided with the chemical substance by spraying. In any case it is assured that the contact surface of the container is completely wetted by the chemical substance.

In an advantageous embodiment of the method according to the invention the second method step is performed by energetic radiation, advantageously by UV radiation, laser beams or electron beams.

Thus, the bond between the primer coating and the wall of the container to be coated is initiated by functionalizing the azide group through UV radiation. When activating the azide group through UV radiation the azide group forms covalent bonds at a bonding location at a wall of the container. The azide group delivers a highly reactive intermediary product during photo activation wherein the highly reactive radical intermediary product can subsequently enter stable covalent bonds with the adjacent surface molecules.

The advantages recited in a context with the container according to the invention are analogously achieved by the method described supra.

According to the instant invention, the second coating can be applied to the contact surface of the container also without a preceding primer coating and can be bonded to the contact surface of the container. In this embodiment the bonding can be improved by plasma treating the contact surface. In any case, negatively charged nucleophilic groups are created when one of the substances recited supra comes in contact with the contact surface of the container which creates a stable bond with the contact surface.

Directly bonding the second coating at the contact surface of the container facilitates advantageously coating the container in a single step. Additionally, production cost of the container can be reduced.

FIG. 1 illustrates a first container 1 according to the invention configured as a blood collection tube 2 configured to store a blood sample from a patient wherein the blood collection tube is made from polypropylene and provided with a primer coating and a second coating to stabilize the blood sample. The blood collection tube 2 is furthermore provided with a closure cover 3 at one end. The closure cover 3 facilitates air tight closure of the blood collection tube 2 in order to assure safe storage and in order to prevent interactions of the blood with the ambient.

Figure 2:
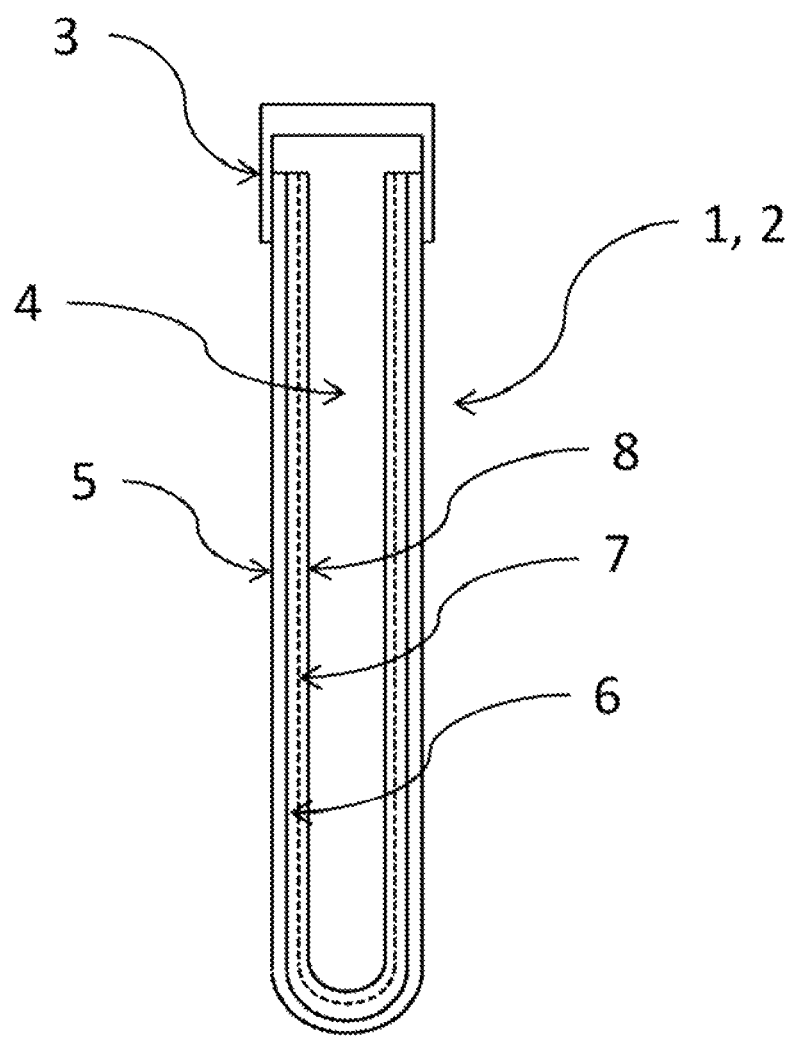
FIG. 2 illustrates a vertical sectional view through the blood collection tube of FIG. 1.

FIG. 2 illustrates a vertical cross section through the blood collection tube 2 illustrated in FIG. 1. A wall 5 of the blood collection tube 2 that is oriented towards an interior space 4 forms a contact surface 6 between the blood and the wall 5 of the blood collection tube 2. The contact surface 6 is provided with a primer coating 7 including a perfluorophenyl azide (PFPA) including an azide group 9 and a functional group 10 wherein a copolymer made from poly(N-vinylamine-co N-vinyl acetamide) is bonded to the functional group 10. Additionally, the blood collection tube 2 includes a second coating 8 which is adjacent to the primer coating 7 and connected therewith.

In order to apply the perfluorophenyl azide to the contact surface 6 of the blood collection tube 2 according to the first method step the perfluorophenyl azide is placed into the blood collection tube 2 as an aqueous solution with a concentration of 5-10 mg/mL. It is appreciated that the perfluorophenyl azide can also be provided in the solution in other concentrations. In any case the solution wets the contact surface 6 of the blood collection tube 2 due to the high affinity of the perfluorophenyl azide to polypropylene which is provided by the hydrophobic properties of the perfluorophenyl azide. Remaining portions of the perfluorophenyl azide which collect as excess liquid in the blood collection tube 2 are removed from the blood collection tube 2.

In the second method step the applied solution is bonded to the blood collection tube 2 by UV radiation. Thus the perfluorophenyl azide is activated so that its azide groups 9 bond irreversibly with the contact surface 6 of the container 1. This is possible for example by the radicalization of the $N_3$ to $N^0$. In a chemical reaction the formamide groups of the copolymer are acid hydrolyzed.

Subsequently the second coating 8 is applied to the blood collection tube 2. The coating includes PEG-PPO block copolymers. The PEG/PPO copolymer is assembled from a sixth-arm star shaped polyethylene glycol (PEG) and a specific propylene oxide (PPO) modification to prevent the crystallization of the polymer. The copolymer is also provided as an aqueous solution. The copolymer is applied in analogy to the first method step. Thus, the isocyanate groups of the PEG-PPO copolymer bond with an amino group 13 of the primer coating 7. In order to reinforce this bond an inner wall 5 of the blood collection tube 2 is treated with UV radiation. The reinforcement can also be performed by plasma treatment.

The layer thicknesses of the coatings 7, 8 illustrated in FIG. 2 are increased for the sake of clarity and not drawn to scale.

Figure 3:
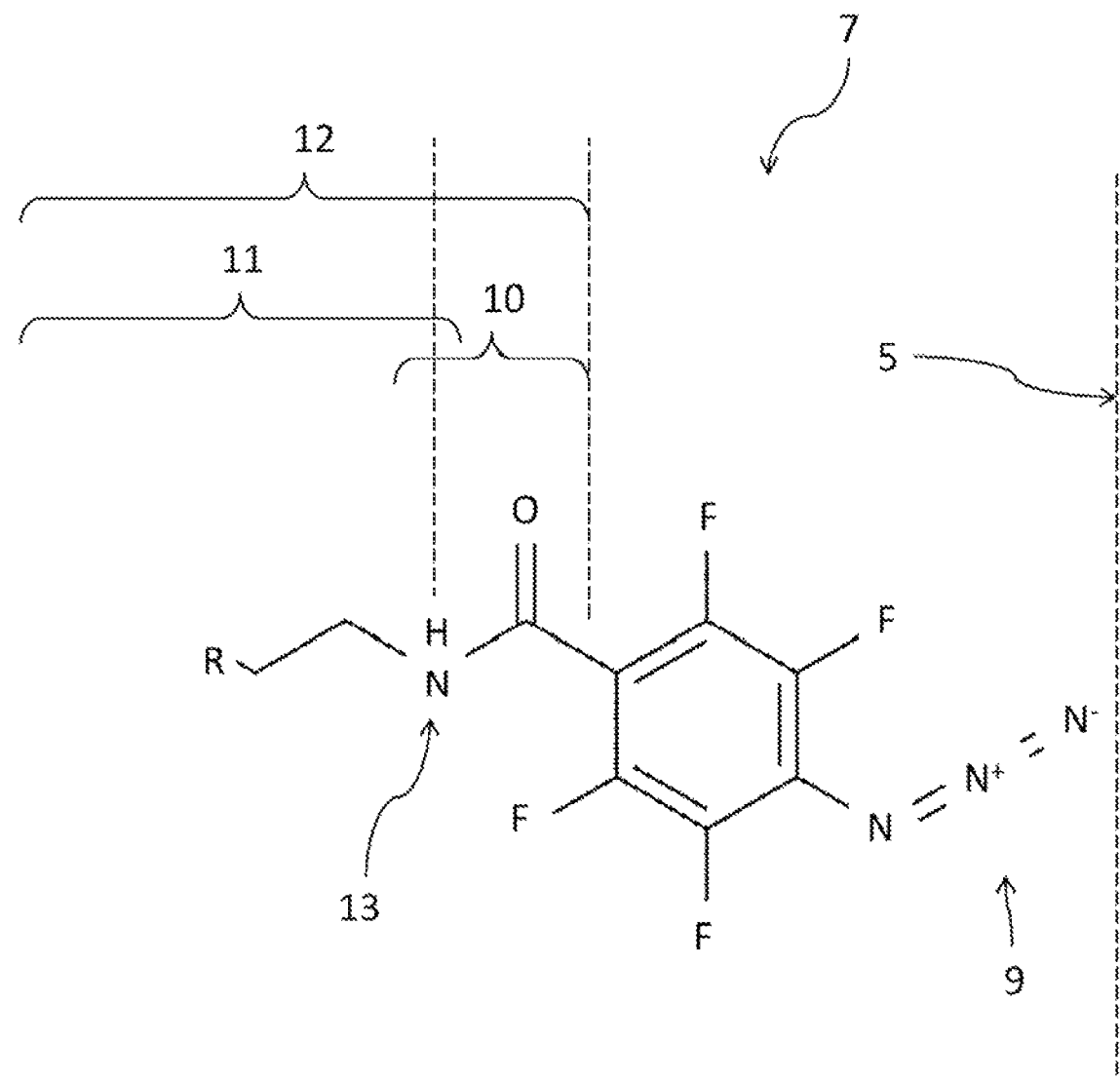
FIG. 3 illustrates structural formula of a primer coating.

FIG. 3 illustrates a structural formula of the primer coating 7 including the azide group 9 and the functional group 10. Thus, the azide group 9 of the perfluorophenyl azide bonds with the wall 5 of the container 1. The copolymer 11 poly(N-vinylamine-co-N-vinyl acetamide) is bonded to the functional group 10 of the perfluorophenyl azide so that a functional rest of the perfluorophenyl azide includes the copolymer 11. An amino group 13 which is provided by the copolymer 11 thus serves as an anchor point for the second coating 8.

REFERENCE NUMERALS AND DESIGNATIONS 1 container
2 blood collection tube
3 closure cover
4 interior space
5 wall
6 contact surface
7 primer coating
8 second coating
9 azide group
10 functional group
11 copolymer
12 functional rest
13 amino group The invention is further described by the following numbered paragraphs:

1. A container (1) for storing a bodily fluid, in particular a blood collection tube (2), comprising:
an interior space (4) configured to store the bodily fluid; and
a wall (5) enveloping the interior space,
wherein a surface of the wall (5) facing the interior space (4) of the container (1) forms a contact surface (6),
wherein at least a portion of the contact surface (6) is provided with a primer coating (7),
wherein the primer coating (7) is formed from a perfluorophenyl azide (PFPA) including an azide group (9) and a functional group (10), and
wherein a copolymer made from poly(N-vinylamine-co-N-vinyl acetamide) is bonded to the functional group (10) of the primer coating (7).

2. The container (1) according to paragraph 1, wherein the container (1) is made from a synthetic material, advantageously polypropylene (PP), polystyrene (PS), polyethylene (PE), polymethylmethacrylate (PMMA), polyimide (PI), or glass.

3. The container (1) according to paragraph 1 or 2, further comprising a second coating (8) including:
a. PEG/PEO-PPO-copolymers,
b. poly-(3-methacryloylaminopropyl)-(2-carboxyethyl)-dimethylmmonium-carboxybetain-methylacrylamid (pCB-MAA-1), or
c. polypeptide based block copolypeptides,
wherein the second coating (8) is connected with the primer coating (7).

4. A method for coating a contact surface (6) of a container (1) for storing a bodily fluid, the method comprising:
a. applying a primer coating made from a perfluorophenyl azide (PFPA) including an azide-group (9) and a functional group (10) to the contact surface (6) of the container (1), wherein a copolymer made from poly(N-vinylamine-co-N-vinyl acetamide) is bonded to the functional group (10) of the primer-coating (7).

b. treating the primer coating applied according to step a. so that the azide group (9) of the perfluorophenyl azide bonds to the contact surface (6) of the container (1) so that a coating (7) is generated that is inseparably connected with the contact surface (6).

5. The method according to paragraph 4, further comprising: an activation step that improves an adhesion of the primer coating (7) at the contact surface (6) of the container (1), wherein the activation step is advantageously performed before the method step a., and/or;
an activation step that improves adhesion of a second coating (8) at the primer coating (7), wherein the activation step is advantageously performed after the method step b.

6. The method according to paragraphs 4-5, wherein at least one activation step is performed by UV radiation or by plasma treatment, and
wherein the plasma is advantageously formed from a noble gas, advantageously argon or oxygen.

7. The method according to paragraph 4-6, wherein the method step a. is performed by flowing the perfluorophenyl azide into the container (1) or spraying the perfluorophenyl azide into the container (1).

8. The method according to paragraphs 4-7, wherein the method step b. is performed by energetic radiation, advantageously UV radiation, laser radiation or electron radiation.

9. The method according to paragraphs 4-8, further comprising:
a. applying PEG/PEO-PPO-copolymers, poly-(3-methacryloylaminopropyl)-(2-carboxyethyl)-dimethylmmonium-carboxybetain-methylacrylamid (pCBMAA-1) or polypeptide-based block copolypeptides to the primer-coating (7) of the container (1),
b. treating the substance applied according to method step a. with energetic radiation, advantageously UV radiation, laser beams or electron beams so that a coating (8) is generated that is inseparably connected with the primer coating (7).

10. The method according to paragraph 9, wherein the second coating including PEG/PEO-PPO-copolymers is bonded to the functional group of the perfluorophenyl azide by isocyanate groups of the PEG/PEO-PPO copolymers.

11. The method according to paragraph 9 or 10, wherein the method step a. is performed by letting the substance into the container (1) or spraying the substance into the container (1).

12. A container (1) for storing a bodily fluid, in particular a blood collection tube (2), comprising:
an interior space (4) configured to store the bodily fluid; and
a wall (5) enveloping the interior space,
wherein a surface of the wall (5) facing the interior space (4) of the container (1) forms a contact surface (6),
wherein at least a portion of the contact surface (6) is provided with a coating including
a. PEG/PEO-PPO-copolymers,
b. poly-(3-methacryloylaminopropyl)-(2-carboxyethyl)-dimethylmmonium-carboxybetain-methylacrylamid (pCBMAA-1), or
c. polypeptide-based block copolypeptides.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A container (1) for storing a bodily fluid comprising:
an interior space (4) configured to store the bodily fluid; and
a wall (5) enveloping the interior space,
wherein a surface of the wall (5) facing the interior space (4) of the container (1) forms a contact surface (6),
wherein at least a portion of the contact surface (6) is provided with a primer coating (7),
wherein the primer coating (7) is formed from a perfluorophenyl azide (PFPA) including an azide group (9) and a functional group (10), and
wherein a copolymer made from poly(N-vinylamine-co-N-vinyl acetamide) is bonded to the functional group (10) of the primer coating (7).

2. The container (1) of claim 1, wherein the container (1) is made from a synthetic material, advantageously polypropylene (PP), polystyrene (PS), polyethylene (PE), polymethylmethacrylate (PMMA), polyimide (PI), or glass.

3. The container (1) of claim 1, further comprising a second coating (8) including:
a. PEG/PEO-PPO-copolymers,
b. poly-(3-methacryloylaminopropyl)-(2-carboxyethyl)-dimethylmmonium-carboxybetain-methylacrylamid (pCBMAA-1), or
c. polypeptide based block copolypeptides,
wherein the second coating (8) is connected with the primer coating (7).

4. The container of claim 1, wherein the container is a blood collection tube (2).

5. A method for coating a contact surface (6) of a container (1) for storing a bodily fluid, the method comprising:
a. applying a primer coating made from a perfluorophenyl azide (PFPA) including an azide-group (9) and a functional group (10) to the contact surface (6) of the container (1), wherein a copolymer made from poly(N-vinylamine-co-N-vinyl acetamide) is bonded to the functional group (10) of the primer-coating (7),
b. treating the primer coating applied according to step a. so that the azide group (9) of the perfluorophenyl azide bonds to the contact surface (6) of the container (1) so that a coating (7) is generated that is inseparably connected with the contact surface (6).

6. The method of claim 5, further comprising:
an activation step that improves an adhesion of the primer coating (7) at the contact surface (6) of the container (1), wherein the activation step is advantageously performed before the method step a., and/or;
an activation step that improves adhesion of a second coating (8) at the primer coating (7), wherein the activation step is advantageously performed after the method step b.

7. The method of claim 5,
wherein at least one activation step is performed by UV radiation or by plasma treatment, and
wherein the plasma is advantageously formed from a noble gas, advantageously argon or oxygen.

8. The method of claim 5, wherein the method step a. is performed by flowing the perfluorophenyl azide into the container (1) or spraying the perfluorophenyl azide into the container (1).

9. The method of claim 5, wherein the method step b. is performed by energetic radiation, advantageously UV radiation, laser radiation or electron radiation.

10. The method of claim 5, further comprising:
   a. applying PEG/PEO-PPO-copolymers, poly-(3-methacryloylaminopropyl)-(2-carboxyethyl)-dimethylmmonium-carboxybetain-methylacrylamid (pCBMAA-1) or polypeptide-based block copolypeptides to the primer-coating (7) of the container (1),
   b. treating the substance applied according to method step a. with energetic radiation, advantageously UV radiation, laser beams or electron beams so that a coating (8) is generated that is inseparably connected with the primer coating (7).

11. The method of claim 10, wherein the second coating including PEG/PEO-PPO-copolymers is bonded to the functional group of the perfluorophenyl azide by isocyanate groups of the PEG/PEO-PPO copolymers.

12. The method of claim 10, wherein the method step a. is performed by letting the substance into the container (1) or spraying the substance into the container (1).

\* \* \* \* \*